United States Patent
Goetzelmann et al.

(10) Patent No.: US 11,999,303 B2
(45) Date of Patent: Jun. 4, 2024

(54) CLADDING PART FOR A MOTOR VEHICLE

(71) Applicant: Magna Exteriors GmbH, Sailauf (DE)

(72) Inventors: Johannes Goetzelmann, Altertheim (DE); Klaus Muenker, Griesstaett (DE); Michael Wurster, Esslingen (DE); Tobias Weyer, Cologne (DE)

(73) Assignee: Magna Exteriors GmbH, Sailauf (DE)

( * ) Notice: Subject to any disclaimer, the term of this patent is extended or adjusted under 35 U.S.C. 154(b) by 0 days.

(21) Appl. No.: 18/243,230

(22) Filed: Sep. 7, 2023

(65) Prior Publication Data

US 2024/0092281 A1 Mar. 21, 2024

(30) Foreign Application Priority Data

Sep. 16, 2022 (DE) .......................... 102022209763.7

(51) Int. Cl.
*B60Q 1/50* (2006.01)
*B60Q 1/26* (2006.01)
*B60R 13/00* (2006.01)

(52) U.S. Cl.
CPC .......... *B60R 13/005* (2013.01); *B60Q 1/2619* (2013.01); *B60Q 1/503* (2013.01)

(58) Field of Classification Search
CPC ............................... B60Q 1/2619; B60Q 1/503
See application file for complete search history.

(56) References Cited

U.S. PATENT DOCUMENTS

| | | | |
|---|---|---|---|
| 2012/0051070 A1 | 3/2012 | Bakacha et al. | |
| 2014/0240954 A1* | 8/2014 | Gullick | G02B 6/001 |
| | | | 362/559 |

FOREIGN PATENT DOCUMENTS

| | | |
|---|---|---|
| DE | 29915295 U1 | 1/2001 |
| DE | 19818009 C2 | 5/2003 |
| DE | 102009039038 A1 | 3/2011 |
| DE | 102018010030 A1 | 6/2019 |
| DE | 102018117728 A1 | 2/2020 |
| DE | 202020104697 U1 | 9/2020 |
| EP | 2589859 A1 | 5/2013 |
| EP | 3144182 B1 | 4/2021 |
| FR | 3048486 A1 | 9/2017 |
| FR | 3117574 A1 | 6/2022 |

* cited by examiner

*Primary Examiner* — Joseph L Williams
(74) *Attorney, Agent, or Firm* — Dickinson Wright PLLC

(57) ABSTRACT

The invention relates to a cladding part of a body shell of a vehicle. The cladding part having a base body, which has a visible side facing towards the outer side and an inner side and which comprises a light window in the form of a light-transmitting transparent or translucent region at least in a sub-region, and an opaque region with a colouring coating at least in a sub-region. The cladding part also having an illumination function, which is arranged behind the visible side of the base body for shining through or illuminating the light window. The cladding part also having a device which has a visible side that has a coloring coating, the device being connected adjustably to the base body in such a way that in a first position the device closes the light window and fully covers the illumination function as seen from the outer side and the visible side is orientated toward the outer side, and in a second position it uncovers the light window and the illumination function as seen from the outer side, in such a way that the illumination function is visible through the light window as seen from the outer side.

10 Claims, 1 Drawing Sheet

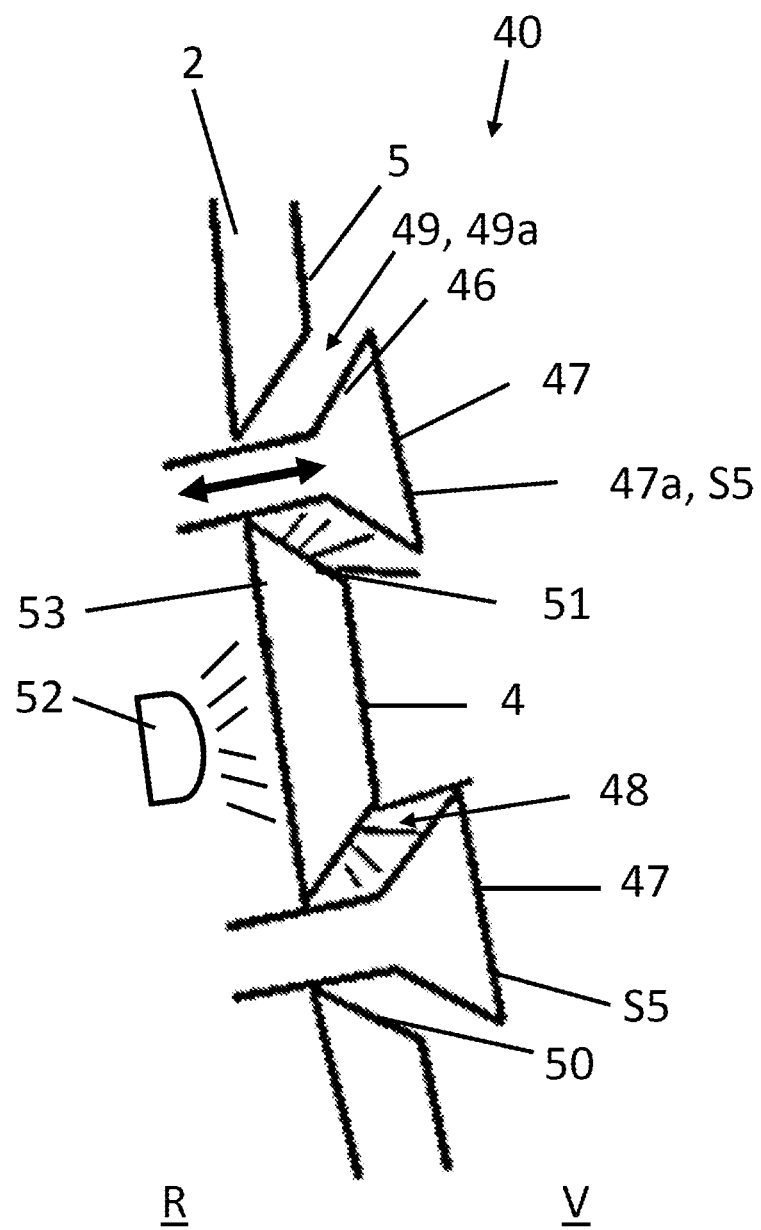

CLADDING PART FOR A MOTOR VEHICLE

CROSS-REFERENCE TO RELATED APPLICATION

This application claims priority to German Application No. DE 102022209763.7 filed on Sep. 16, 2022. The entire disclosure of the above application is incorporated herein by reference.

FIELD OF THE INVENTION

The invention relates generally to a cladding part for a motor vehicle, and more particularly, the cladding part being a front module.

BACKGROUND OF THE INVENTION

This section provides information related to the present disclosure which is not necessarily prior art.

Owing to the increasing spread of electric vehicles, the requirements placed on front panels are changing since radiator inlet openings are not required to the same extent as for conventional motor vehicles with internal combustion engines. Front panels in electric vehicles are increasingly being provided with closed radiator claddings which results in better aerodynamics of the vehicle together with less requirement for cooling air.

Front panels may be manufactured from a transparent polycarbonate and provided with suitable decorative elements or functional elements, for example illumination modules. For this purpose, the front panels are produced according to the prior art by a two-component injection-moulding method. The rear side, that is to say the vehicle inner side of the three-dimensionally shaped front panel, is subsequently painted, while the front side, that is to say the outer side of the vehicle, needs to be protected against paint spray. To this end, the front side is masked. In order to produce multi-colored structures, impressed geometries of the front panel are exposed using a laser. The inner side is subsequently coated by a physical vapour deposition method (PVD) in order to obtain a chrome effect together with light transparency. A hard paint coating is applied to the front side.

It is furthermore known to integrate separate components, for example brand symbols, into the front panels. The components may be decorated with a chrome film and subsequently fitted into corresponding recesses of the moulded plastic parts painted with the coloration of the paint of the motor vehicle.

These decorative components, for example brand symbols, may be illuminated from the rear side by the use of light-transmitting materials, and therefore form a decorative illumination function. However, such known cladding elements with integrated light functions have the disadvantage that the illumination is only decorative and is not functional illumination.

A cladding part of a motor vehicle, which provides an illumination function, is known from the document EP 3 144 182 B1. The cladding part has a wall which delimits the internal space of the cladding part. One or more through-openings are formed by piercing the wall. An illumination apparatus is arranged in the internal space of the cladding part and is connected to a light source. In order to move the illumination apparatus between an open setting, in which the light emitted by the illumination apparatus passes through the through-openings, and a closed setting in which the light emitted by the illumination apparatus does not pass through the through-openings, an adjustment apparatus is provided.

The document DE 10 2018 010 030 A1 discloses a rear light of a motor vehicle. The rear light consists of a transparent cover lens, which is provided with white light sources. The transparent cover lens is coloured red for an uncolored transparent window. The transparent window is equipped with a mechanically movable filter element. A red-colored region is located between the window and the light sources. The uncolored transparent region is located between the window and the light sources and is arranged on optical lens elements.

SUMMARY OF THE INVENTION

This section provides a general summary of the disclosure, and is not a comprehensive disclosure of its full scope or all of its features.

It is an object of the present disclosure to provide a cladding part having a colored visible side, the color preferably being the body color, for a motor vehicle, which provides at least one illumination function, a light module with a light function not being visible to a user as seen from the outer side of the motor vehicle in a first state, and being visible to the user from the outer side in a second state.

The object is achieved by a cladding part having a base body, which has a visible side facing toward the outer side and an inner side and which comprises a light window in the form of a light-transmitting transparent or translucent region at least in a sub-region, and an opaque region with a colouring coating at least in a sub-region, having an illumination function, which is arranged behind the visible side of the base body for shining through or illuminating the light window and having a device which has a visible side that has a coloring coating, the device being connected adjustably to the base body in such a way that in a first position the device closes the light window and fully covers the illumination function as seen from the outer side and the visible side is orientated towards the outer side, and in a second position it uncovers the light window and the illumination function as seen from the outer side, in such a way that the illumination function is visible through the light window as seen from the outer side.

By virtue of the cladding part according to the present disclosure, it is possible to produce an illumination function/functional illumination with a "secret until lit" function. This means that in a first state the illumination function is not visible to a user and is covered by a first position of a device. In a second state, the illumination function, which comprises at least one light source, is visible to a user from the outer side and the device is set in a corresponding second position.

In general, the device of the cladding part may also have more than two adjustable positions and thus constitute various illumination functions which vary in brightness, emission angle, illumination angle and beam position, etc.

By virtue of the cladding part according to the present disclosure, it is furthermore possible to provide the user of a motor vehicle and/or a road user at least temporarily with different light functions. These light functions may involve both safety-relevant aspects and possibilities for communication by illuminated symbols or lettering. The light functions may also involve design features. In this way, an extension of the functional possibilities of illuminated front panels is achieved. For example, the indicator function may be envisaged as a further integratable function.

The device is connected to a base body of the cladding element in such a way that it can be adjusted into the first and second positions. Further positions are likewise possible.

In the first state and the first position of the device, the device is inserted into the base body, preferably flush, into a light window formed in the base body, in such a way that the cladding element has a uniform appearance. In one embodiment, this uniform appearance is painting with a uniform color. Correspondingly, the visible side of the device, directed towards the outer side, is likewise provided with painting and/or a coating in the first position.

In further embodiments, the visible side may also have numbers, lettering, emblems, reflectors and/or design elements, and therefore not fully blend with the outer contour of the vehicle.

Advantageously, in the first position the device is inserted in the base body, or the decoration carrier, in the region of the light window in such a way that a seamless surface region flush with the adjacent areas is formed on the outer side of the cladding part.

In a particularly preferred embodiment, the coloring coating of the visible side of the device is the same color as the coloring coating of the base body, this color corresponding to the body color of the motor vehicle. In this way, a uniform coloring coating is perceptible to the user through the cladding part from the outer side of the motor vehicle in the first position of the device.

In the second position, the device is adjusted so that it is held connected to the base body of the cladding element, in such a way that the illumination function is visible to a user from the outer side of the motor vehicle through the light window formed in the base body.

The adjustment movement is advantageously achieved by means of suitable kinematic elements.

The base body of the cladding element is advantageously a composite component which comprises a deep-drawn decoration carrier, in particular film, back-injection-moulded with a transparent polymer material, the decoration carrier being provided at least partially with a color layer and having at least one transparent or translucent light window.

Definitions in the context of the present disclosure follow. An outer side is intended to mean the surface visible to a user from the surroundings. The inner side is correspondingly the opposite side from the outer side, facing toward the inner side.

A cladding part is intended, in particular, to mean an external cladding part, for example a front panel, the front panel being three-dimensionally configured.

The light window in the context of the present invention may be a transparent or semi-transparent/translucent region formed in the base body of the cladding element. The base body is for example produced by a deep-drawn film, into which corresponding punching is introduced, the film subsequently being back-injection-moulded with a transparent plastic material by an injection-moulding method. The side which is back-injection-moulded with transparent plastic material, preferably a polycarbonate, forms the side visible to a user on the motor vehicle in the finished and assembled situation of the cladding element.

The coloring coating may be produced by painting or a paint film.

The illumination function is produced by at least one light source. One or more LEDs may be used as a light source. In a preferred embodiment, the light of the light source may be coupled into a light-guide body which emits the light at corresponding light output coupling structures.

According to the present disclosure, the device is a section which is adjustable in translation outwards.

Further areas of applicability will become apparent from the description provided herein. The description and specific examples in this summary are intended for purposes of illustration only and are not intended to limit the scope of the present disclosure.

DRAWING

The drawing described herein is for illustrative purposes only of selected embodiments and not all possible implementations, and are not intended to limit the scope of the present disclosure.

FIG. 1 shows an embodiment in a sectional view in the second state, in which the light function is enabled and activated.

DESCRIPTION OF THE INVENTION

A cladding part 40 according to the present disclosure is described below with the aid of a front panel as external cladding in the front region of an electric vehicle. It is clear that cladding part 40 may also be used as a cladding element at any other desired place on a motor vehicle. The cladding part 40 is preferably also a bumper cladding, a boot lid cladding, a door cladding, a roof cladding or a spoiler, or is a component of one of the aforementioned parts.

The cladding part 40 has a base body 2 which is a three-dimensionally configured composite plastic component that may be manufactured by various production methods or method steps. In the drawing, the cladding part 40 is shown as a detail in a schematic sectional representation and has a front side (V) and a rear side (R). The front side V is the visible side of the body shell of the motor vehicle in the intended installation situation on the motor vehicle and is visible to a user.

The composite plastic component comprises a deep-drawn three-dimensionally configured decoration carrier 4 and at least one externally-arranged transparent cover layer 5. The decoration carrier 4 is a plastic film, in particular a transparent plastic film, which has a colored coating/painting on the side facing toward the outer side. The painting may correspond in terms of coloration to the painting of the motor vehicle.

The film as a decoration carrier 4 is back-injection-moulded by an injection-moulding method with a transparent polymer material, preferably a polycarbonate, on the side facing towards the front side in order to produce the cover layer 5.

FIG. 1 shows an embodiment of the cladding part 40 according to the present disclosure with the base body 2 configured with a coloring coating. The base body 2 is produced from a plastic material such as a PP, polycarbonate or ABS and is painted in color. The base body 2 has a multiplicity of openings or recesses, which form light windows 49. The light windows 49 are configured conically with an internally running chamfer.

As may be seen from the drawing, the device 47 is configured in the form of slide elements, also referred to below as inserts. The slide elements are mounted longitudinally displaceably in the light windows 49 and have a head region 47a with a visible side S5 directed toward the outer side and a conical section 46 formed on the rear side thereof. This conical section 46 is conical, or circumferentially chamfered, in its geometry so as to correspond to the chamfered or conically configured openings of the base body 2, and thus allows flush reception of the head region 47a in the light windows in the first position.

Following on from the conical section 46, the inserts are configured with a pin guided through the opening. By means of this pin, the multiplicity of inserts are connected on the rear side to a holding element which, for adjustment into the second position which is represented in FIG. 1, comprises kinematics and actuators assigned to the holding element.

The inserts may be configured as decoration elements, at least in the head region 47a, and may be configured with different colors, or as a chromed or PVD-coated component, at least on the visible side, side S5, directed toward the outer side.

In one embodiment, the slide elements or inserts are painted at least on the visible side S5 uniformly like the painted base carrier 2, or the decoration carrier 4. This colour corresponds to the body colour, so that a uniform appearance which is as seamless as possible is formed for a user starting from the outer side in the first position, in which the device is inserted flush in the base body.

In the second position represented in FIG. 1, the device 47 or the multiplicity of slide elements are displaced outwards beyond the surface contour of the base body 2 by means of an adjustment movement. In this position, there is respectively a circumferential light gap 49a between the openings in the base body 2 and the slide elements, so that the illumination function 48 is enabled and the emitted light can shine through the light gap toward the outer side.

The illumination function 48 which can be enabled in the second state is in this case formed by the base body 2, which is configured as a light-guide body 53 at least in a rear sub-region. A light source 52 arranged at the rear in the internal space couples the light into the light-guide body. The light-guide body also comprises the chamfered section in the base body, which forms the circumferential contour of the light window. The light is then emitted by the circumferential contour as a light exit face 49 through the light gap 49a toward the outer side.

The transparent light exit face in the base body is produced by masking, or by ablation (mechanical, lasering, etc.) of the coloring coating.

In one embodiment, which is not represented, the light element itself is configured so that it is held embedded in the base body in the region of the opening and thus constitutes the circumferential contour of the opening.

It is a feature of the chamfered, conically extending surfaces which delimit the light windows in the base body and the correspondingly configured supporting faces on the slide element that, during the adjustment movement in the first position with respect to one another, they form a defined end point for the retraction of the slide elements into the closed state, in order to generate a seamless appearance which is as flat as possible on the outer face of the cladding element. Furthermore, in this first position the illumination function itself is concealed and is not visible in the closed state.

The shape of the openings and of the slide elements may be selected freely, so that besides angled and round shapes even more complex contours such as brand emblems and lettering may be represented here.

What is claimed is:

1. A cladding part of a body shell of a vehicle, comprising:
   a base body, which has a visible side facing towards the outer side and an inner side and which comprises a light window in the form of a light-transmitting transparent or translucent region at least in a sub-region, and an opaque region with a coloring coating at least in a sub-region;
   an illumination function, which is arranged behind the visible side of the base body for shining through or illuminating the light window; and
   a device which has a visible side that has a coloring coating, the device being connected adjustably to the base body in such a way that in a first position the device closes the light window and fully covers the illumination function as seen from the outer side and the visible side is orientated toward the outer side, and in a second position the device uncovers the light window and the illumination function as seen from the outer side, in such a way that the illumination function is visible through the light window as seen from the outer side, wherein the device has at least one slide element mounted longitudinally displaceably on the base body with a head region forming the visible side and a conical section formed on the rear side of the head region, the light window being configured as a through-recess formed in the base body, which is configured with a conically configured recess for flush reception of the head region of the slide element in the first position, and the slide element being held in the second position at least with the head region extended toward the outer side, so that a light-transmitting gap is created between the slide element and the light window, and in that the base body is free of a coloring coating in the region of the conically configured recess and forms a light exit face for the illumination function.

2. The cladding part according to claim 1, wherein the coloring coating of the base body and the coloring coating of the visible side of the device are configured with the same color, preferably the body color.

3. The cladding part according to claim 1, wherein the base body as a composite plastic component has a three-dimensionally configured decoration carrier and at least one externally arranged transparent cover layer, the cover layer being formed by back-injection-moulding from a polymer material on the outwardly facing side of the decoration carrier.

4. The cladding part according to claim 3, wherein the decoration carrier is a transparent plastic film, which preferably has painting in order to form the coloring coating.

5. The cladding part according to claim 3, wherein in order to form the coloring coating, the decoration carrier is a colored opaque film which, in order to form the light-transmitting region, is provided with at least one punching or recess in order to form the light window.

6. The cladding part according to claim 1, wherein the device in the first position is inserted in the base body or the decoration carrier in such a way that a surface region flush with the adjacent areas is formed on the outer side of the cladding part.

7. The cladding part according to claim 1, wherein the illumination function comprises at least one light source, which is preferably configured as one or more LEDs.

8. The cladding part according to claim 5, wherein the illumination function comprises at least one light-guide body, the light of the light source coupled into the light-guide body being capable of being coupled out at light-guide structures.

9. The cladding part according to claim 1, wherein the head region is configured as a brand emblem or symbol or lettering.

10. The cladding part according to claim 1, wherein the illumination function may involve both safety-relevant aspects, such as a flashing light function, and illuminated symbols, lettering or illuminated brand emblems.

\* \* \* \* \*